(12) United States Patent
Govindan et al.

(10) Patent No.: US 9,920,855 B2
(45) Date of Patent: Mar. 20, 2018

(54) METHOD FOR TRANSMITTING DATA FOR DEVICE DIAGNOSTICS AND IMPLEMENTATIONS THEREOF

(71) Applicant: Dresser, Inc., Addison, TX (US)

(72) Inventors: Vidya Govindan, San Ramon, CA (US); Rama Krishna Raju Mudunuru, Dublin, CA (US); Sudhakar Reddy, San Ramon, CA (US)

(73) Assignee: Dresser Inc., Addison, TX (US)

( * ) Notice: Subject to any disclaimer, the term of this patent is extended or adjusted under 35 U.S.C. 154(b) by 753 days.

(21) Appl. No.: 14/530,790

(22) Filed: Nov. 2, 2014

(65) Prior Publication Data

US 2015/0285398 A1  Oct. 8, 2015

Related U.S. Application Data

(60) Provisional application No. 61/975,313, filed on Apr. 4, 2014.

(51) Int. Cl.
  *G06F 11/30* (2006.01)
  *F16K 37/00* (2006.01)
  (Continued)

(52) U.S. Cl.
  CPC ......... *F16K 37/0075* (2013.01); *G06Q 10/06* (2013.01); *G06Q 10/10* (2013.01); *G06Q 50/04* (2013.01); *Y02P 90/30* (2015.11)

(58) Field of Classification Search
  CPC ...... G06F 17/28; G06F 17/21; G06F 17/3056; G06F 17/30979; H04L 67/2828; G06N 5/046
  See application file for complete search history.

(56) References Cited

U.S. PATENT DOCUMENTS 5,761,419 A * 6/1998 Schwartz ............ H04L 12/1813
  709/204
7,110,843 B2   9/2006 Pagnano et al.
  (Continued)

FOREIGN PATENT DOCUMENTS

WO   20120138228 A1   10/2012

OTHER PUBLICATIONS

PCT Search Report and Written Opinion dated May 4, 2015 in relation to corresponding PCT application PCT/US2015/016299.

*Primary Examiner* — Elias Desta
(74) *Attorney, Agent, or Firm* — Paul Frank + Collins P.C.

(57) ABSTRACT

A method that simplifies the exchange of data to facilitate delivery of data that relates to operation of a valve assembly to a Web-based user interface over a network. In one embodiment, the method configures an apparatus to receive data about the valve assembly in a first format and to generate an output in a second format, e.g., JavaScript Object Notation (JSON) format. The method may also configure the device with an architecture with multiple layers, wherein the architecture can exchange data in the JSON format between a first layer and a second layer. This architecture is configured to be lightweight as compared to the SOAP/HTTP architecture found in conventional techniques, typically deploying a Representational State Transfer (REST) structure that permits use of JavaScript Object Notation (JSON) format to communicate among the architecture layers and with the web-based user interface.

11 Claims, 5 Drawing Sheets

(51) Int. Cl.
  *G06Q 10/06* (2012.01)
  *G06Q 10/10* (2012.01)
  *G06Q 50/04* (2012.01)

(56) References Cited

U.S. PATENT DOCUMENTS

| | | |
|---|---|---|
| 7,130,773 B1 | 10/2006 | Wong |
| 8,312,892 B2 | 11/2012 | Wilke |
| 8,565,928 B2 | 10/2013 | Venkatakrishnan et al. |
| 8,739,126 B2 * | 5/2014 | Glaser ................ G06F 11/3664 709/219 |
| 2001/0037156 A1 | 11/2001 | Boger et al. |
| 2004/0103144 A1 | 5/2004 | Sallam et al. |
| 2013/0110418 A1 | 5/2013 | Nousiainen |
| 2013/0262035 A1 * | 10/2013 | Mills ..................... G01D 9/005 702/188 |

* cited by examiner

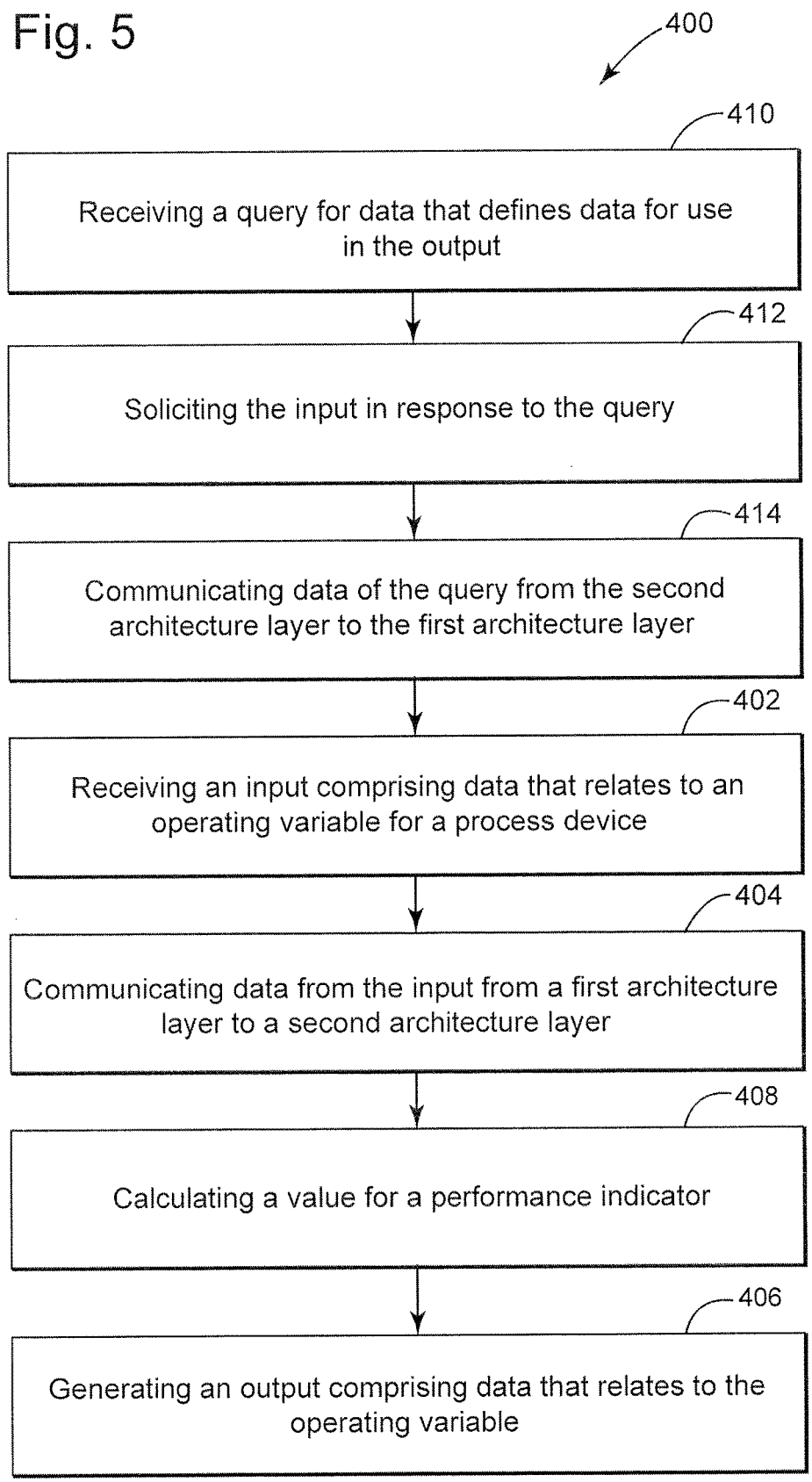

METHOD FOR TRANSMITTING DATA FOR DEVICE DIAGNOSTICS AND IMPLEMENTATIONS THEREOF

CROSS-REFERENCE TO RELATED APPLICATIONS

This application claims the benefit of priority to U.S. Provisional Application Ser. No. 61/975,313, filed on Apr. 4, 2014, and entitled "DEVICE AND METHOD FOR TRANSMITTING DATA FOR DEVICE DIAGNOSTICS," the content of which is incorporated by reference herein in its entirety.

BACKGROUND

The subject matter disclosed herein relates to process automation and device diagnostics with particular discussion about device architecture to efficiently exchange diagnostic data with remote devices via a network.

Industrial factories and like facilities operate process lines that may include many varieties of flow controls. Examples of these flow controls include pneumatic and electronic valve assemblies (also "control valves") that regulate a flow of process fluid (e.g., gas and liquid). In conventional configurations, these valve assemblies have a number of components that work together to regulate flow of process fluid through the valve assembly. These components include a stem, a closure member, a seat, and an actuator that couples with the stem to change the position of the closure member relative to the seat. Examples of the closure member may embody a plug, ball, butterfly valve, and/or like implement that can contact the seat to prevent flow. The components can also include various linkages and springs that ensure proper movement, e.g., of the stem and/or the closure member. In some constructions, the valve assembly incorporates a valve positioner with electrical and/or electro-pneumatic components. During operation, the valve positioner receives control signals from a controller that is part of a process control system (also "distributed control system" or "DCS"). These control signals define operating parameters for the valve assembly, namely, a position for the closure member relative to the seat. In response to the control signal, the valve positioner delivers a pneumatic signal that regulates instrument gas to pressurize the actuator in order to regulate this position.

Problems with devices on the process line may disrupt the process and/or prevent the process line from achieving the necessary process parameters. The resulting disruptions can lower yields and reduce quality. In large refineries, chemical plants, and power plants, disruptions can also lead to significant expense from process downtime that is necessary to troubleshoot and repair the problematic devices. Plant operators therefore have an interest to detect problems at the device-level before problems manifest in ways that can hinder sustainable operation of the process line.

Conventional technology for monitoring operation of process lines can interface with the DCS to retrieve data that relates to the process devices. This technology also incorporates features to process the data. For example, data processing features are available that generate information that is useful for quantitative and/or qualitative diagnostics to address operation of the individual devices. In many implementations, the technology also makes the information readily available; for example, software packages can provide user interfaces that offer data presentation features that present the information to an end user on a comprehensive display.

The advent of software service platforms that offer cloud-based and/or remotely-supported software packages often require monitoring solutions that can provide end users access to information on Web-based interfaces via a network. Unfortunately, many conventional techniques deploy architecture that exchange data using Web services that rely on Extensible Markup Language (XML) as a message format and Simple Object Access Protocol (SOAP) and HTTP for enveloping and transporting of the messages. These techniques, for the most part, require lengthy coding that needs to be parsed for appropriate use and processing of the data encoded therein.

BRIEF DESCRIPTION OF THE INVENTION

This disclosure describes improvements that simplify the exchange of data to facilitate delivery of data for device diagnostics to Web-based interfaces. These embodiments adopt architecture that is lightweight as compared to the SOAP/HTTP architecture found in conventional techniques. Examples of the architecture can deploy Representational State Transfer (REST) structure, which utilizes calls that are much less complex than many other structures including Web Services and SOAP. The REST structure, in turn, permits use of data formats that are language-independent, including JavaScript Object Notation (JSON). Collectively, these features allow the embodiments to deliver data over the network in a manner that permits the end user to observe the data in real-time, or near real-time, on the user interface.

BRIEF DESCRIPTION OF THE DRAWINGS

Reference is now made briefly to the accompanying drawings, in which:

FIG. 5 depicts a flow diagram of an exemplary embodiment of a method for generating an output with data about the performance indicator in response to an input from a web-based user interface.

Figure 1:
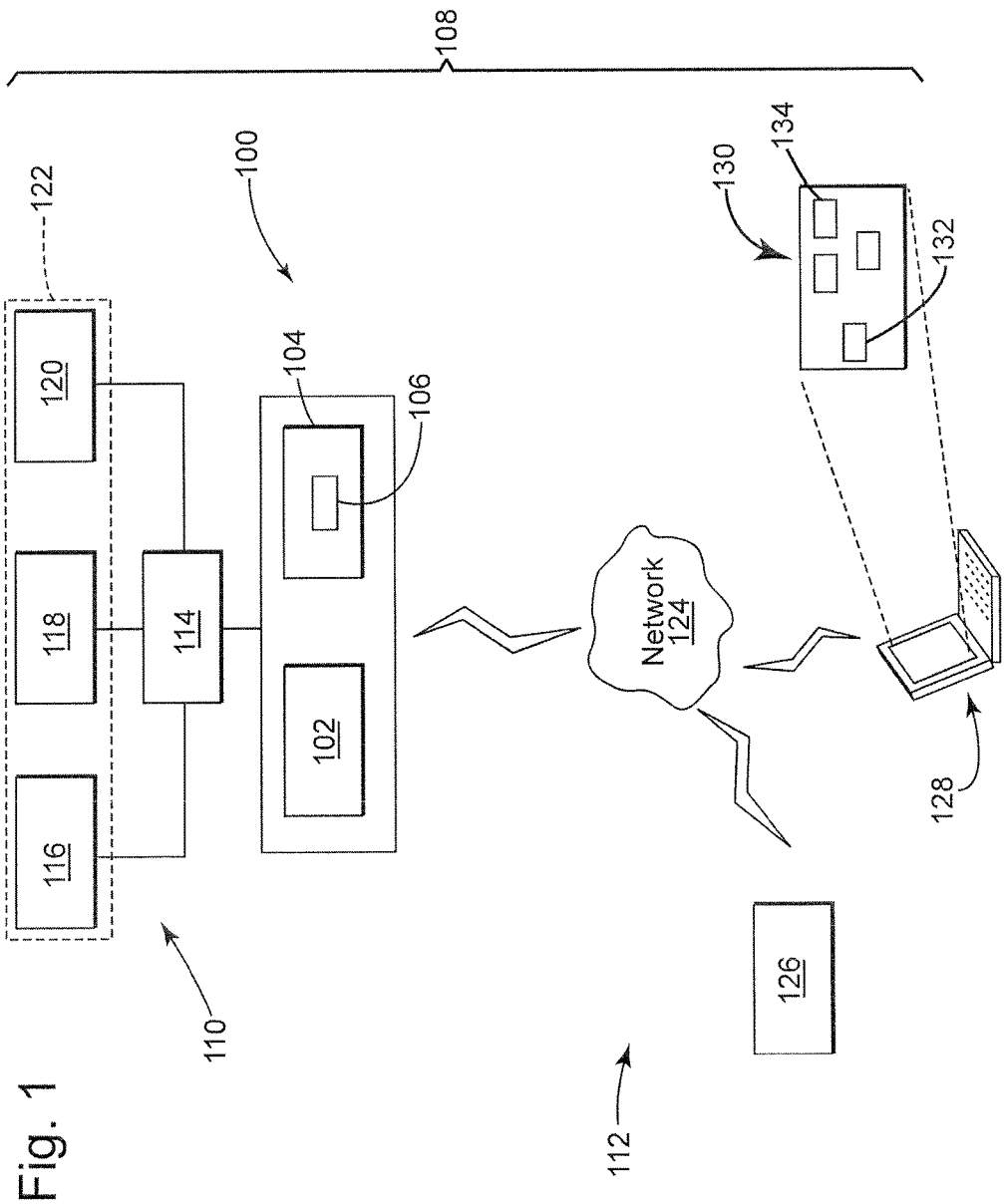
FIG. 1 depicts a schematic diagram of an exemplary embodiment of an apparatus that can perform processes to deliver diagnostic data for display on a user interface.

Where applicable like reference characters designate identical or corresponding components and units throughout the several views, which are not to scale unless otherwise indicated. Moreover, the embodiments disclosed herein may include elements that appear in one or more of the several views or in combinations of the several views.

DETAILED DESCRIPTION

FIG. 1 illustrates a schematic diagram of an exemplary embodiment of an apparatus 100 that can perform processes (e.g., computer-implemented processes) to deliver diagnostic data in JSON format. The apparatus 100 can embody a computing device with a processor 102, a memory 104 that couples with the processor 102, and executable instructions 106 that are stored on the memory 104. The executable instructions 106 can comprise all or part of computer programs (e.g., software and firmware) and like compilations of instructions (collectively, "software") that are configured to be executed by the processor 102.

As also shown in FIG. 1, the apparatus 100 is part of a system 108 with a process component 110 and a network component 112. The process component 110 can include a process server 114 that couples with one or more process devices (e.g., a first process device 116, a second process device 118, and a third process device 120), all of which may be part of a process line 122. In certain implementations contemplated herein, the process devices 116, 118, 120 can embody control valve assemblies with components (e.g., positioner, actuator, stem, closure member, etc.) that are configured to modulate flow of process fluids through the process line 122. The network component 112 includes a network 124, which couples with the apparatus 100 and with one or more remote devices (e.g., an external server 126 and a terminal 128). The external server 126 may be configured to collect and store data, as well as to perform other peripheral functions, for example, to store software for access by the apparatus 100. Examples of the terminal 128 can include a variety of computing devices (e.g., personal computers, workstations, laptop computers, tablet computers, smartphones, etc.) that can display a user interface 130 with various icons (e.g., a data display icon 132 and a selectable icon 134). An end user can utilize the icons 132, 134 of the user interface 130 to view data (e.g., through the data display icon 132) and to instruct the apparatus 100 to deliver data (e.g., through the selectable icon 134).

The apparatus 100 is configured to streamline the exchange of data among the components of the system 108.

from, values for operating variables (e.g., setpoint, position, actuator pressure, date/time stamp, supply pressure, supply temperature, etc.).

Figure 2:
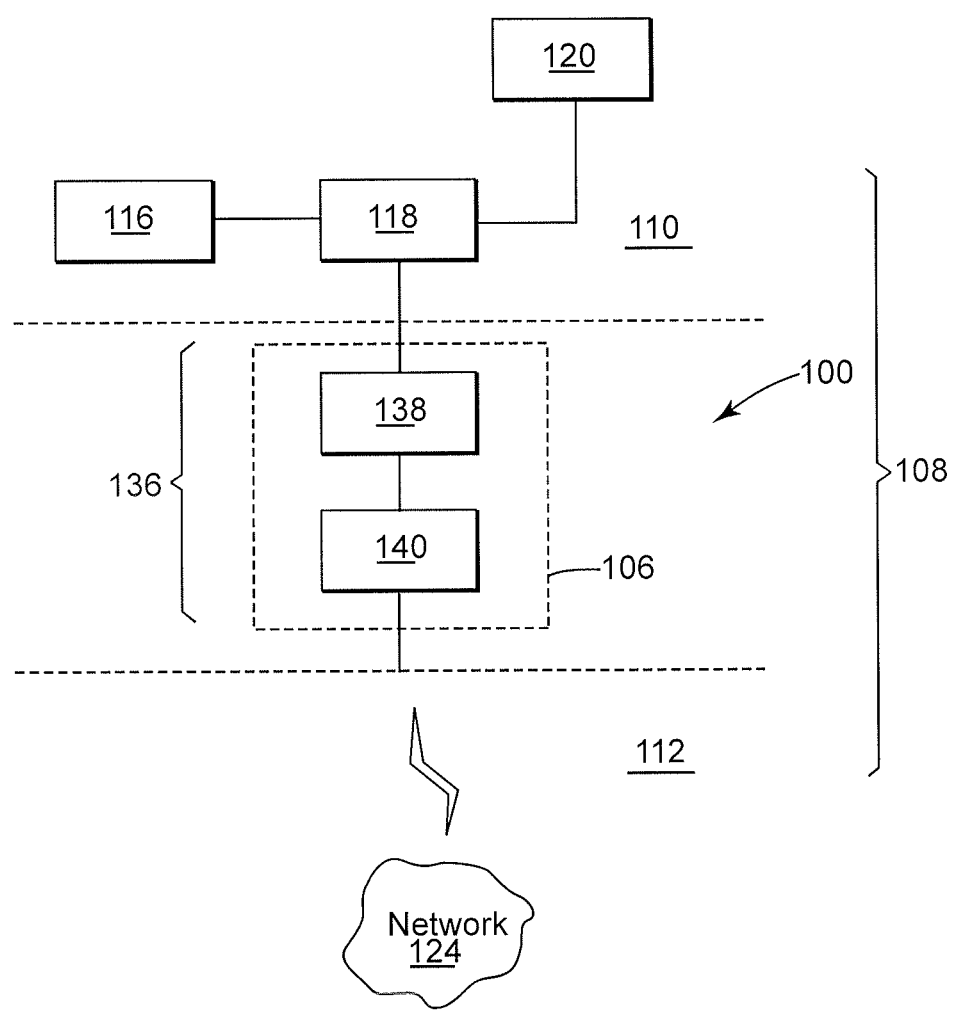
FIG. 2 depicts a schematic diagram of a configuration for the apparatus of FIG. 1, wherein the configuration sets forth an architecture with layers that can communicate with one another.

FIG. 2 illustrates a schematic diagram of the apparatus 100 to illustrate one configuration that can streamline the exchange of data with the components of the system 108. In this configuration, the software 106 provides an architecture 136 with a layered structure that includes a first architecture layer 138 (also, "communication layer 138") and a second architecture layer 140 (also, "service layer 140"). Implementations of the architecture 136 can embody layers (e.g., the layers 138, 140) that are different from one another; for example, the layers may perform different functions and/or processes within the hierarchical structure of the architecture 136 that is set out by the software.

The architecture 136 may rely on communication protocols that use simple calls to communicate between components of the system 108. These calls may conform with representational state transfer ("REST") structure that can use HTTP requests to perform various communication operations that create data, update data, read data, and delete data. This structure offers a lightweight alternative to Remote Procedure Calls and Web Services (e.g., SOAP, WSDL, etc.), among other architectures that are used by conventional data exchange techniques, particularly with respect to diagnostic data from, or about, valve assemblies found on a process line. This lightweight structure simplifies the calls and data requests. For device diagnostics and related data management for valve assemblies, the HTTP requests significantly reduce the coding and other tasks necessary to implement the REST structure for use with diagnostic data (e.g., data that relates to process devices like control valve assemblies. Table 1 below offers a comparison of a request that is configured using REST structure and conventional techniques (i.e., Web Services and SOAP):

TABLE 1

| REST Structure and HTTP requests | http://www.acme.com/phonebook/userdetails/12345 |
|---|---|
| Web Services and SOAP | <?xml version="1.0"?><br><soap:Envelope<br>xmlns:soap=http://www.w3.org/2001/12/soap-envelope<br>soap:encodingStyle=http://www.w3.org/2001/12/soap-encolding><br>   <soap:body pb="http://www.acme.com/phonebook:><br>      <pb:GetUserDetails><br>         <pb:UserID>12345</pb:UserID><br>      </pb:GetUserDetails><br>   </soap:Body><br></soap:Envelope> |

Figure 3:
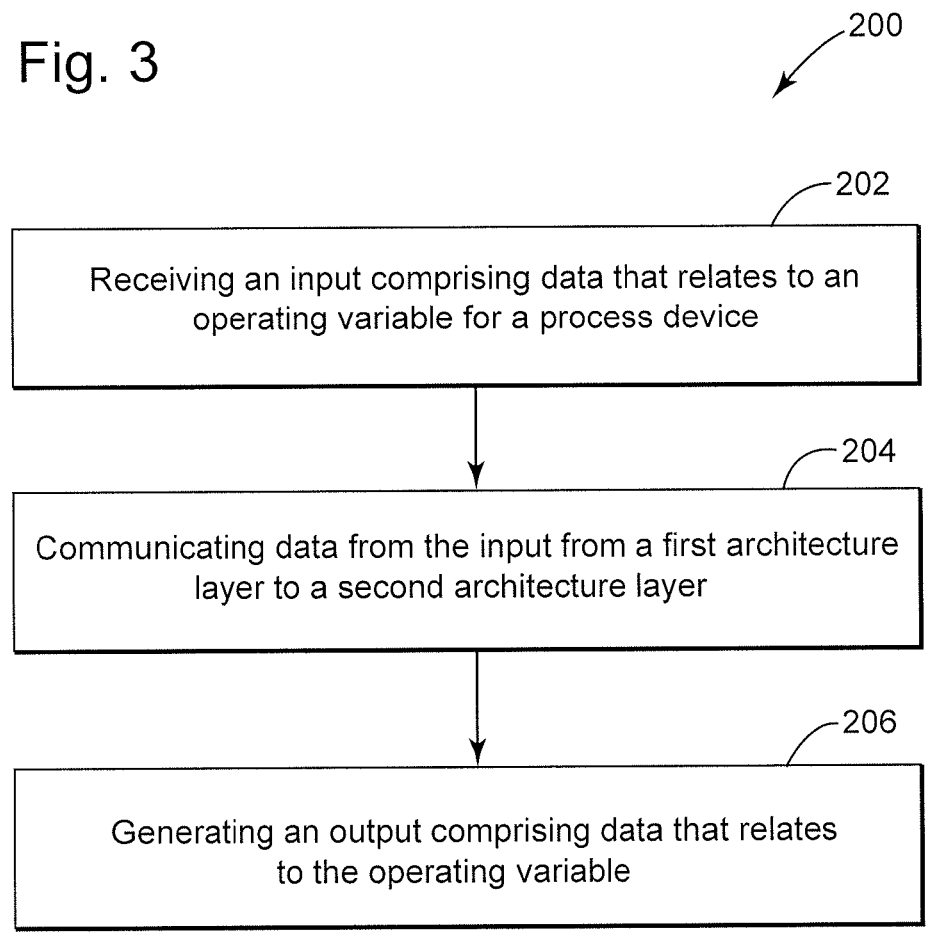
FIG. 3 depicts a flow diagram of an exemplary embodiment of a method for exchanging data in JSON format between architecture layers.

These configurations utilize communication protocols and data formats, for example, that provide only the data necessary (and in the format favorable) for distribution on the network 124 to display on the user interface 130. This feature makes the exchange of data across the system 108 much less complex than those used in conventional techniques. By reducing complexity, the apparatus 100 (and, in turn, implementations thereof) can provide real-time and/or near real-time data to an end user at the web-based user interface 130. In particular, the embodiments herein can exchange data that relates to device diagnostics for the individual valve assemblies that may found through the process line 122. These device diagnostics rely on data that conveys information about the operation of the process devices 116, 118, 120; often in the form of, and/or derived FIG. 3 illustrates a flow diagram for an exemplary embodiment of a method 200 to exchange diagnostic data using the REST structure. The method 200 includes, at step 202, receiving an input comprising data that relates to an operating variable for a process device. The method 200 also includes, at step 204, communicating data from the input from a first architecture layer to a second architecture layer. The method 200 further includes, at step 206, generating an output comprising data that relates to the operating variable.

The step of receiving the input (e.g., at step 202) exchanges data that may reflect operation of devices found on a process line. The input can define this data using a first format, which specifies the convention(s) by which the input communicates the scope, content, and nature of the data that is encoded therein. The method 200 may deploy formats that are consistent with the communication protocol for networks found in a plant and/or factory automation environment. Examples of these communication protocols include Foundation Fieldbus®, HART, OPC, and like protocols that deliver process control instructions to operate devices, e.g., control valve assemblies, typically over 4-20 mA analog instrumentation wiring. As shown in FIG. 2, the first architecture layer 138 can couple with the process component 110 in the system 108. This configuration permits the first architecture layer 138 to exchange data with one or more of the process server 114 and the process devices 116, 118, 120. In one example, data flows from the process server 114 to the apparatus 100. This configuration permits the exchange of data that relates to operating variables for any one of the process devices 116, 118, 120. In other examples, the apparatus 100 is configured to interface directly with one of the process devices 116, 118, 120. This configuration is useful to retrieve data directly from the device; often as a result of the device being taken off-line and removed from the process line (e.g., process line 122 of FIG. 1).

The step of communicating data from the input (e.g., at step 204) describes the exchange of data within the architecture 136 of the apparatus 100. This step may include steps for converting the data to a second format. Broadly, the second format has features that are different from the first format, which as noted above is often the conventional format that is used to transfer data among the process control system and the process devices. In FIG. 2, these steps are useful to exchange data from one layer (e.g., the first layer) to another layer (e.g., the second layer) in the layered structure of the architecture 136. This second format can utilize a language-independent specification, which is compatible for use to transmit data over a network to Web-based applications. Examples of language-independent specifications include JavaScript Object Notation (JSON) format, which can simplify the exchange of data within the REST structure. In one example, the first architecture layer 138 is configured to deliver data to the second architecture layer 140 in the JSON format.

The step of generating the output (e.g., at step 206) configures the data for delivery over a network. The output can define the data using the second format, a strategy which aligns with the simplified structure illustrated in Table 1 above. Structurally, and as shown in FIG. 2, the second architecture layer 140 can couple with the network component 112 to exchange data with the network 124. This configuration connects the apparatus 100 with the terminal 128 in order to display data that relates to the operation of the process devices 116, 118, 120 on the user interface 130. In one implementation, the system 108 may be configured with a user interface layer, which can be one or more software programs implemented as web-based and/or a cloud-based service. As noted above, the architecture proposed herein can facilitate communication of data between these programs and the apparatus 100. In one implementation, the terminal 128 can access these software programs to offer the operative features of the user interface 130 locally to the end user, e.g., via a Web page and/or portal. The second architecture layer 140 can transmit data to and/or receive data from the user interface layer. This configuration can allow the end user to select the information for display on the user interface 130, for example by selecting one of the selectable icons 134. Executable instructions for the user interface layer can reside on the apparatus 100; however, alternative configurations can allow for these executable instruction to reside, e.g., on the external server 126 as part of software delivery platforms that link the end user, via the network 124, to the process component 114 to perform remote diagnostics on the devices found therein.

Figure 4:
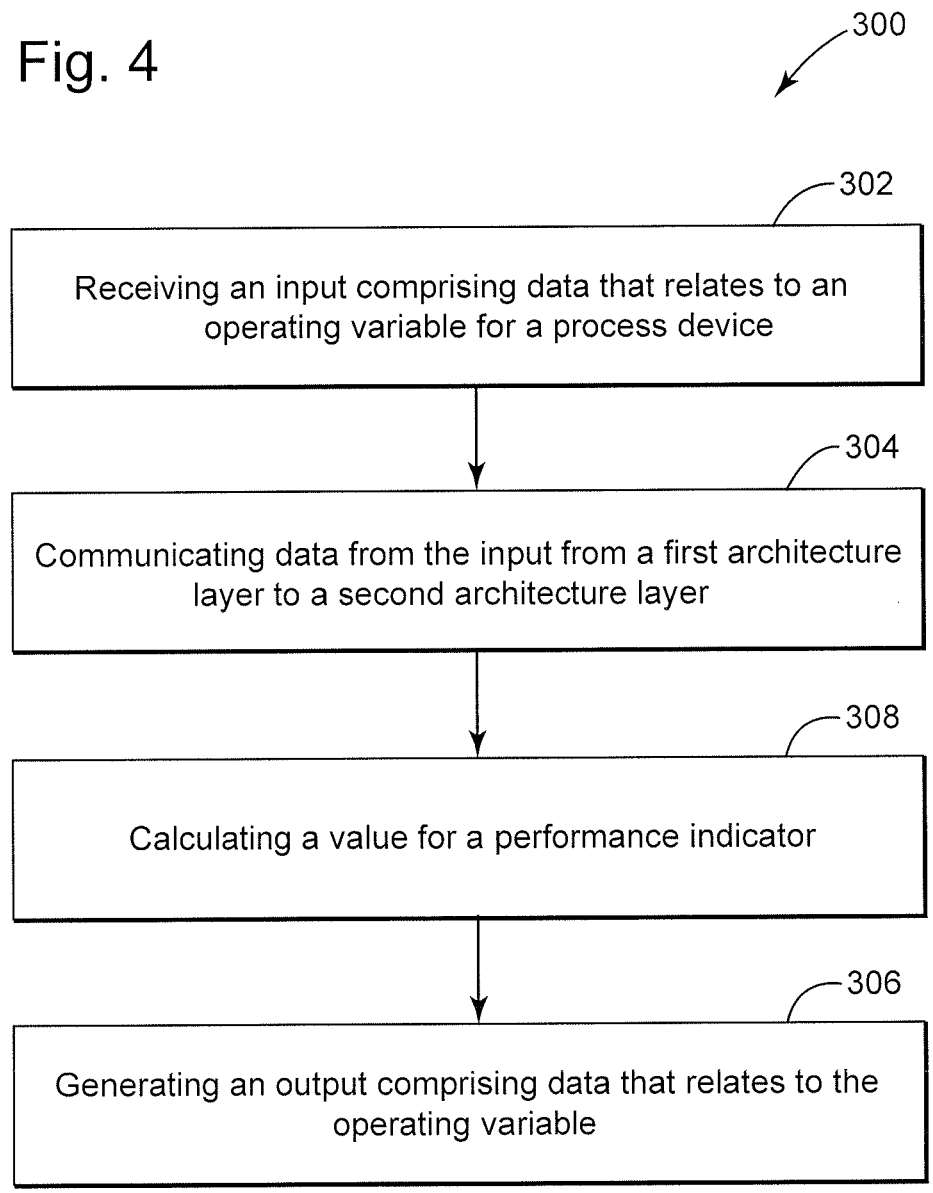
FIG. 4 depicts a flow diagram of an exemplary embodiment of a method that results in an output with data that relates to a value for a performance indicator of a valve assembly.

FIG. 4 illustrates a flow diagram for an exemplary embodiment of a method 300 that generates data for use through a Web-based user interface. The method 300 can include one or more steps for receiving an input (at step 302), communicating data between architecture layers (at step 304), and generating an output (at step 306). This embodiment also includes, at step 308, calculating a value for a performance indicator. In one implementation, the second architecture layer 140 (FIG. 2) is configured to complete these requisite calculations. The output (at step 306) can comprise data that reflects this value, for example, by using the second format to define data indicative of the value for the performance indicator. Examples of the performance indicator include friction, spring range, lag, stick-slip, and like parameters that can, in one example, be mathematically calculated from the operating variables discussed herein. For several examples of such mathematical calculations, reference can be had to U.S. Pat. No. 7,089,086 to Schoonover ("Schoonover") and commonly assigned to the Assignee designated in the present application. The content of Schoonover is incorporated by reference herein in its entirety.

FIG. 5 depicts a flow diagram for an exemplary embodiment of a method 400 that implements features for the end user to tailor data for use on the Web-based user interface. In addition to one or more steps previously outlined in connection with FIG. 4 above, this embodiment can include, at step 410, receiving a query for data that defines data for use in the output. The embodiment can also include, at step 412, soliciting the input in response to the query and, at step 414, communicating data of the query from the second architecture layer to the first architecture layer.

The step of receiving the query (e.g., at step 410) facilitates use of the Web-based user interface to provide data that is useful for the end user to perform diagnostics and other maintenance task on process devices. As noted above, and shown in FIG. 1, the user interface includes selectable icons 134 that the end user can manipulate, e.g., by point and clicking with a mouse, finger, stylus, and/or like effector. The terminal 128 can generate the query in response to the selection of one of the icons 134. Examples of the query can include data that request certain information for use and display on the user interface 130 (e.g., the selection of one of the selectable icons 134 may request data for the process line 122 and/or one or more of the process devices 116, 118, 120). In one implementation, the query can take the form of one or more data packets (or like electronic signals) that transit to the apparatus 100 via the network 124. The second architecture layer 140 can be configured to receive the query, providing appropriate processing to communicate data that relates to the data in the query to the first architecture layer 138.

The step of soliciting the input (e.g., at step 412) obtains information that relates to the query. This information may include diagnostic data (e.g., data that relates to the operating variables noted herein); however, this disclosure does consider that the proposed architecture (and features/elements) are amenable to other types of information that may find use, e.g., for display on the user interface 130. One implementation of the proposed structure configures the first architecture layer 138 to communicate with the process component 110, for example, to communicate with the process server 114 to request and/or retrieve data to satisfy the query.

The step of communicating data from the query (e.g., at step 414) packages data into the output for use on the user interface. As noted herein, and particularly in connection with FIG. 4, the method 400 may include steps for performing certain analytics on the data (e.g., at step 408) that generates quantitative and qualitative information that relates to the query. The output can include data that reflects this information. In one implementation, the output is in the second format (e.g., the JSON format) to efficiently transmit the data via the network 124 for display on the user interface 130.

In view of the foregoing, the embodiments above deploy architecture that simplifies the exchange of data that relates to operation of process devices on the process line. This architecture is configured to transmit data in data formats that are language-independent. A technical effect of this structure is to allow the embodiments to deliver data in real-time, or near real-time, over a network for display on a user interface.

This disclosure contemplates embodiments that may be implemented on any device where relevant data is present and/or is otherwise accessible. For example, the embodiments can be implemented as executable instructions (e.g., software, firmware, hardware, etc.) on the valve positioner. The valve positioner can transmit the output of the embodiments to a distributed control system, an asset management system, independent monitoring computing device (e.g., a desktop computer, laptop computer, tablet, smartphone, mobile device, etc.). In another embodiment, the embodiments can obtain data from a historian (e.g., a repository, memory, etc.), and send to an independent diagnostic computer device. The historian is conventionally connected to the asset management system or distributed control system. The diagnostic computing device has all the capabilities of the monitoring computer and the additional capability to execute executable instructions for the embodiment to process the given data. In another embodiment, the valve positioner is configured to send data by wires or wirelessly to the diagnostic computing device, as well as through peripheral and complimentary channels (e.g., through intermediate devices such as a DCS or may be connected directly to the diagnostic computer).

One or more of the steps of the methods can be coded as one or more executable instructions (e.g., hardware, firmware, software, software programs, etc.). These executable instructions can be part of a computer-implemented method and/or program, which can be executed by a processor and/or processing device. The processor may be configured to execute these executable instructions, as well as to process inputs and to generate outputs, as set forth herein. For example, the software can run on the process device, the diagnostics server, and/or as software, application, or other aggregation of executable instructions on a separate computer, tablet, laptop, smart phone, wearable device, and like computing device. These devices can display the user interface (also, a "graphical user interface") that allows the end user to interact with the software to view and input information and data as contemplated herein.

The computing components (e.g., memory and processor) can embody hardware that incorporates with other hardware (e.g., circuitry) to form a unitary and/or monolithic unit devised to execute computer programs and/or executable instructions (e.g., in the form of firmware and software). Exemplary circuits of this type include discrete elements such as resistors, transistors, diodes, switches, and capacitors. Examples of a processor include microprocessors and other logic devices such as field programmable gate arrays ("FPGAs") and application specific integrated circuits ("ASICs"). Memory includes volatile and non-volatile memory and can store executable instructions in the form of software (and/or firmware) instructions and configuration settings. Although all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

Aspects of the present disclosure may be embodied as a system, method, or computer program product. The embodiments may take the form of an entirely hardware embodiment, an entirely software embodiment (including firmware, software, etc.) or an embodiment combining software and hardware aspects that may all generally be referred to herein as a "circuit," "module" or "system." The computer program product may embody one or more non-transitory computer readable medium(s) having computer readable program code embodied thereon.

Computer program code for carrying out operations for aspects of the present invention may be written in any combination of one or more programming languages, including an object oriented programming language and conventional procedural programming languages. Program code embodied on a computer readable medium may be transmitted using any appropriate medium, including but not limited to wireless, wireline, optical fiber cable, RF, etc., or any suitable combination of the foregoing.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
   a process line comprising a valve assembly;
   4-20 analog instrumentation wiring coupled to the valve assembly to exchange signals;
   a computing device coupled with the 4-20 analog instrumentation wiring, the computing device generating signals to manage operation of the valve assembly;
   a network coupled with the computing device; and
   a terminal coupled with the network, the terminal having a display with a Web-based user interface,
   wherein the computing device comprises,
      a processor;
      a memory coupled with the processor, the memory having executable instructions stored thereon that are configured to be accessed and executed by the processor, the executable instructions comprising instructions for implementing an architecture comprising a first architecture layer and a second architecture layer, which is different from the first architecture layer, wherein the first architecture layer is configured to exchange data in a first format that allows communication between the computing device and the valve assembly, the data relating to an operating variable for the valve assembly on the process line, wherein the second architecture layer is configured to exchange data in a second format with the network, wherein the second format is different from the first format, and wherein the second format utilizes a JavaScript Object Notation (JSON) format, and wherein the data in JSON format transits the network to change the Web-based user interface on the display to correspond with real-time operation of the valve assembly.

2. The system of claim 1, wherein the architecture is configured to exchange data using a representational state transfer protocol.

3. The system of claim 1, wherein the second architecture layer is configured to receive a query in the second format via the network, wherein the query defines data that will be included in an output to the network, wherein the query is configured as an HTTP request, and wherein the first architecture layer is configured to solicit data from the process component using the first format in response to the query.

4. The system of claim 1, wherein the executable instructions comprise instructions that configure the first architecture layer to exchange data with a valve positioner on the valve assembly on the process line.

5. The system of claim 1, wherein the executable instructions comprise instructions that configure the first architecture layer to exchange data with a process server of the process component.

6. The system of claim 1, wherein the second architecture layer is configured to calculate a value for a performance indicator from the data and to communicate the value to the network in the second format.

7. The system of claim 1, wherein the operating variable relates to one of a setpoint, a position, an actuator pressure, a date/time stamp, a supply pressure, or a supply temperature.

8. A method, comprising:
using 4-20 analog instrumentation wiring to connect a valve assembly with a computing device;
using a network to connect the computing device with a terminal having a display; and
operating the computing device to format data for use on a Web-based user interface on the display by,
receiving, at a first architecture layer, an input comprising data that relates to an operating variable for the valve assembly, the input having a first format that allows communication between the computing device and the valve assembly;
exchanging the input data with a second architecture layer in a second format utilizing a JavaScript Object Notation (JSON) format;
calculating, at the second architecture layer, a value for a performance indicator that relates to the input data;
generating, at the second architecture layer, an output comprising data that relates to the value of the performance indicator, the output using the JavaScript Object Notation (JSON) format; and
causing the output to transmit to the network to change the Web-based user interface to correspond with real-time operation of the valve assembly.

9. The method of claim 8, further comprising receiving a query in the JSON format at the second architecture layer, wherein the output comprises data that relates to the query.

10. The method of claim 9, wherein the query is configured as an HTTP request.

11. The method of claim 10, further comprising, in response to the query, soliciting data from the valve assembly at the first architecture layer using the first format.

* * * * *